United States Patent [19]

Fritze et al.

[11] 4,254,150

[45] Mar. 3, 1981

[54] PROCESS FOR PRODUCING A FOODSTUFF OF CEREAL

[75] Inventors: Hartwig Fritze, Weingarten; Kurt Koenemann; Richard Koenemann, both of Neuss, all of Fed. Rep. of Germany

[73] Assignee: Escher Wyss G.m.b.H., Ravensburg, Fed. Rep. of Germany

[21] Appl. No.: 970,985

[22] Filed: Dec. 19, 1978

[30] Foreign Application Priority Data

Dec. 21, 1977 [DE] Fed. Rep. of Germany ....... 2757036

[51] Int. Cl.³ ...................... C12P 19/14; C12P 19/20; A23K 1/00
[52] U.S. Cl. ......................................... 426/18; 426/49; 426/52; 426/53; 426/74; 426/520; 426/518; 426/524; 426/457; 435/96; 435/99
[58] Field of Search ................ 426/518, 520, 28, 524, 426/18, 49, 74, 52, 53, 96, 457; 195/31 R; 127/29; 435/96, 99

[56] References Cited

U.S. PATENT DOCUMENTS

| 3,137,639 | 6/1964 | Hurst et al. | 195/31 R |
| 3,249,512 | 5/1966 | Bode | 425/28 X |
| 3,280,006 | 10/1966 | Hurst et al. | 195/31 R |
| 3,311,542 | 3/1967 | Kerr | 435/96 |
| 3,336,137 | 8/1967 | Hickey | 426/28 |
| 3,617,300 | 11/1971 | Borochoff et al. | 426/28 |
| 3,663,369 | 5/1972 | Morehouse et al. | 195/31 R |
| 3,910,820 | 10/1975 | Holt et al. | 195/31 R |
| 3,922,196 | 11/1975 | Leach et al. | 195/31 R |
| 3,922,198 | 11/1975 | Kuske et al. | 195/31 R X |
| 4,056,636 | 11/1977 | Muller | 195/31 R X |

*Primary Examiner*—R. B. Penland
*Attorney, Agent, or Firm*—Robert A. Ostmann

[57] ABSTRACT

In a process for producing a foodstuff, more particularly a fodder from cereal, it is disclosed to saccharify the starch contained in the cereal to form dextrose by enzymatic degradation of the starch in the cereal grain. All the cereal substances, both those containing starch and those not containing starch, are treated together in the process of enzymatic degradation of the starch in the cereal grain until the starch has been converted to dextrose in the cereal grain. The product is then dried.

8 Claims, 1 Drawing Figure

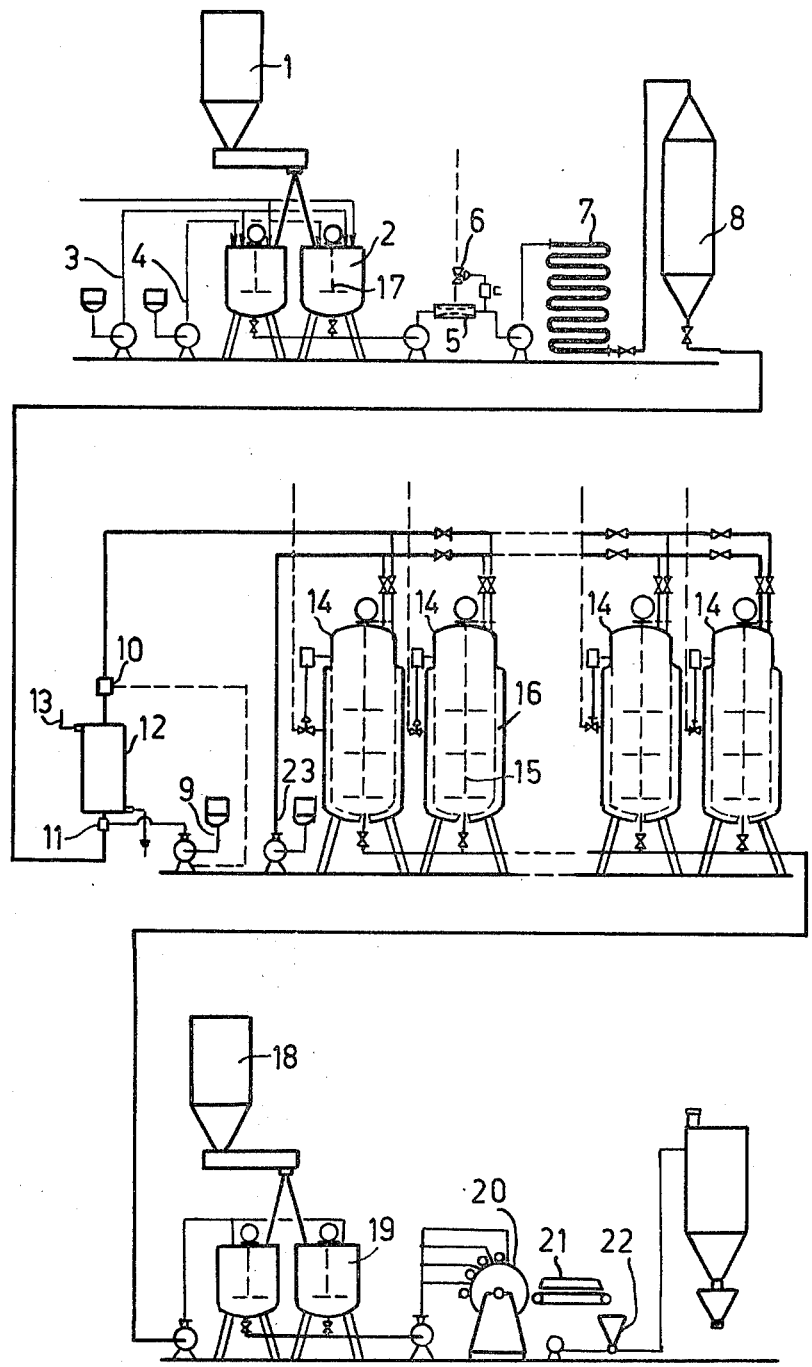

PROCESS FOR PRODUCING A FOODSTUFF OF CEREAL

BACKGROUND OF THE INVENTION

The invention relates to a process for producing a foodstuff, more particularly a fodder, from cereal, e.g. wheat, rye, barley, rice, Indian corn, etc.

There are types of cereal which have a high yield but which can be regarded as low quality nutritional matter for humans and animals. Flour produced from these types of cereal does have a high starch content but this is accompanied by a small amount of gluten, with the result that such flour is wholly or largely unsuitable for both baking and boiling. These types of cereal, e.g. high yield wheat, are, however, not even suitable for direct use as fodder, since many animal organisms are incapable of making full use of the nutrients they could contain. Thus, when these types of cereal are used as animal fodder, the results which could theoretically be expected do not materialize, compared with the high nutrient content. The growth of the animals fed on these substances is inadequate.

SUMMARY OF THE INVENTION

The aim of this invention is to produce a high quality foodstuff, more particularly a fodder, from cereal, especially those types of cereal of inferior quality as defined above, which will have an improved nutritive value owing to the fact that the majority of the nutrients can be used better than is possible when the cereal is used directly. In addition, the foodstuff, or more particularly the fodder, should be relatively cheap.

This aim is achieved according to the invention by the fact that, in the process, the starch contained in the cereal is saccharified to form dextrose, by enzymatic degradation of the starch in the grain, whilst in the enzymatic degradation of the starch in the grain all the cereal substances, i.e. both those which contain starch and those which do not, are treated together until the starch has been converted to dextrose in the grain, and the product is then dried.

The foodstuff produced according to the invention has a very good flavour, being sweet, and the dextrose it contains is absorbed directly as sugar by the body.

The process is cheap, since degradation is carried out in the grain without any need to separate the starch from the grain or from the other dry substances such as gluten, fibres, husks, before the conversion. The expensive starch recovery process is unnecessary here. The foodstuff also contains sufficient ballast materials, i.e. all the cereal substances which do not contain starch, such as gluten, husks and fibre, which aid the process of digestion in the body. It gives very good results as an animal feed and is particularly suitable as fodder, particularly for young animals. It may also readily be used as food for humans. It may be eaten on its own or with other components, in the form of muesli or cereal flakes, for example.

BRIEF DESCRIPTION OF THE DRAWING

The process will now be described in more detail with reference to a drawing which diagramatically shows an apparatus for performing the process.

DESCRIPTION OF THE PREFERRED EMBODIMENTS

Before the process, the cereal, e.g. wheat, is dry-cleaned and then ground to a coarse to medium-fine grist, preferably in a hammer mill.

From the supply container 1, the grist is passed into a mash container 2 with a stirrer 17 for the swelling process. Here, the grist is mixed with water, in a proportion of 20 to 40% dry substance, to form a mash which is then left to swell for about 1 hour, with constant stirring, at a temperature below the gelatinization temperature. A base, such as sodium hydroxide solution, is then added to the swollen mash through a metering device 3, and the pH of the mash is adjusted to about 6.5 to 7 with this base. At the same time, the enzyme α-amylase is added to the mash from a metering device 4, in an amount of about 0.1%, based on the dry content of the mash.

The mash pre-treated in this way is taken from the mash container 2 and passed into the first stage of a true enzymatic degradation process. While the pretreated mash is being removed from the first mash container 2, the pretreatment described above is carried out in the second mash container. The timing and volume of the pretreatment equipment is controlled so as to give a quasi-continuous process. Pretreated mash can be removed from the equipment continuously. First, the pretreated mash is passed through an injection steam cooker 5, i.e. a starch cooker in which the mash is heated to 100° to 110° C. by a direct injection of steam from an automatically regulated steam pipe. At this temperature, the mash is passed through an adjoining tube-type converter 7 which is designed for a retention time of from 2 to 10 minutes. After leaving the tube-type converter, the mash is released from pressure, so that a temperature of about 95° C. is reached. In this state, the mash is passed into a circulatory reaction vessel 8 which is designed for a retention time of 45 to 75 minutes. In this first stage, now completed, of the enzymatic degradation, the grist is liquefied and the starch contained in the cereal grain is degraded to maltodextrin. This phase of the process is continuous.

Immediately after the mash leaves the circulatory reaction vessel 8 the second stage of enzymatic degradation begins. The mash which now contains matodextrin is first readjusted to a pH of about 4 to 5. This is effected by introducing, for example, hydrochloric acid through a metering device 9, there being a circulatory mixing cooler 12 connected between the measuring means 10 and adjustment means 11 of the metering device. This cooler 12 is connected to a cooling pipe 13 and is equipped with static mixing elements. Thus, the cooling to a temperature of about 50° to 70° C., required for the second stage of the degradation process, and the adjustments of the pH value are effected continuously and simultaneously in this circulatory mixing cooler. During the cooling operation, the built-in static mixing elements distribute the regulator, e.g. hydrochloric acid, in the mash so homogeneously that a constant pH value can be recorded after a very short time. This section of the second stage of degradation takes place continuously.

The mash treated as described above is passed from the cooler 12 into a series of thermostatically controlled reaction tanks 14 in which the final phase of the enzymatic degradation of the starch takes place.

Each thermostatically controlled tank 14 is provided with a stirrer 15 and a heating jacket 16 and connected to the piping from the circulatory mixing cooler 12. When the tank which is connected up at that time is half full of the mash to be treated, a specified amount (approx. 0.1 to 0.2%) of the enzyme amyloglucosidase is added through a metering device 23; this enzyme finally converts the starch, which has already been degraded to maltodextrin, into dextrose, in per se known manner. Depending on the retention time chosen, e.g. 24 or 48 hours, a dextrose equivalent value of about 85 to 96 or more is obtained in the product. In order to effect quasi-continuous feed and discharge in this reaction phase of the second stage of the degradation process, a series of tanks 14 is used. Only 4 tanks are shown in the drawing, for the sake of simplicity, but 5 to 8 tanks are required, depending on the retention time chosen or required for technical reasons. One tank full of finished product is always being emptied while another tank is being filled with the mash which is to be treated. The operation is controlled so that the time taken to fill a tank is the same as that taken to empty it. In the case of a column of eight tanks and a reaction time of 48 hours, this would mean an emptying time and filling time of about 6 hours each. If, as mentioned hereinbefore, the amyloglucosidase is added to the mash wilst the tank is being filled, the enzyme starts to act from the moment it is added, with the result that a reaction is already occurring whilst the remainder of the tank is being filled. The overall effect of this is to reduce the tank volume required.

After the reaction time is ended, the product as such is ready, and the conversion of the starch in the cereal grain into dextrose is complete. The product could be used as fodder in this form, i.e. as a liquid straight from the tank. However, to make the product durable and commercially viable, it is subsequently dried and put into a marketable form. This may be done immediately after the product has been removed from the reaction tank, with all the cereal substances being treated together in the drying process, e.i both those which contained starch at first when the grist was fed into the process and those which did not contain starch.

If desired, supplements or fillers are added to the liquid product before the drying process. An apparatus provided for this purpose comprises a supply container 18 from which the supplements and/or fillers are added to the product in a mixing vessel 19. If the product is to be used as fodder, flour waste, cereal flakes, groats or mill by-products such as bran, etc. may be used, for example; supplements may include minerals, vitamins and the like. Two mixing vessels 19 are used so that this phase of the process can also be carried out quasi-continuously.

The finished mixture is fed into a drying and processing apparatus. This advantageously comprises a single-roll drier 20 provided with application rolls. Here, the liquid is removed from the product or mixture and at the same time the product is stabilized. After the drier 20 is provided an after-cooling apparatus 21 fitted with air jets, in which the thermoplasticity of the end product is broken down to enable it to be processed to form flakes, for example, in a subsequent comminuting apparatus 22. The process for producing the foodstuff, more particularly fodder, is then complete and the product can be packed in sacks, for example.

We claim:

1. A process for producing foodstuff flakes from cereal by enzymatic conversion of starch in situ to dextrose comprising the steps of
    a. forming a mash consisting of 20% to 40% whole cereal grains or grains ground to coarse to medium fine grist and water;
    b. allowing the mash to swell for a period of 1-2 hours while maintaining it at a temperature below the gelatinization point of the starch;
    c. adding to the swelled mash alpha amylase in an amount between 0.05% and 0.5% based on the dry cereal;
    d. adjusting the pH of the mash to 6.5 to 7 by the addition of sodium hydroxide solution;
    e. heating the mash resulting from the preceding steps in a steam injection cooker to a temperature of 100° to 110° C., then passing the mash at that temperature through a tube type converter with a retention time of 3 to 5 minutes, and thereafter passing the mash through a circulatory reaction vessel with a retention time of about 1 hour and at a temperature of 95° C. to thereby effect conversion of starch to maltodextrin;
    f. cooling the maltodextrin-containing mash, readjusting its pH to a level effective to promote the action of amyloglucosidase by the addition of a second pH regulator, and then feeding the mash to a reaction tank;
    g. adding amyloglucosidase to the mash in the reaction tank;
    h. storing the mash containing amyloglucosidase in the reaction tank for a period of 24 to 48 hours to effect conversion of maltodextrin to dextrose;
    i. drying the whole dextrose-containing mash resulting from the preceding steps on a single roll dryer to form a thermoplastic film;
    j. removing and cooling said film to make it friable; and
    k. comminuting the cooled, friable film to form flakes.

2. A process as defined in claim 1 including the step of adding supplements and/or fillers to the dextrose-containing treated mash before the latter is subjected to said drying step.

3. A process as defined in claim 2 in which said supplements and fillers include flour waste, or groats and/or minerals and flavorings.

4. A process as defined in claim 1 wherein said mash containing maltodextrin is cooled in a circulatory mixing cooler equipped with static mixing elements; said second regulator is added to the mash in said cooler; and said cooling and said addition of the second regulator take place simultaneously and continuously.

5. A process as defined in claim 1 in which said step of adding amyloglucosidase is performed while the reaction tank is being filled.

6. A process as defined in claim 5 in which the amyloglucosidase is added when the reaction tank is about half full of mash.

7. A process as defined in claim 1 in which said cooled maltodextrin-containing mash is fed to a series of reaction tanks which are filled in sequence, the process being controlled so that the time required to fill a tank equals the time required to empty a tank.

8. A process as defined in claim 7 in which the number of reaction tanks is so correlated with the length of time the mash is storred in each tank that one tank is filled while another is emptied.

* * * * *